United States Patent Office 2,708,516
Patented May 17, 1955

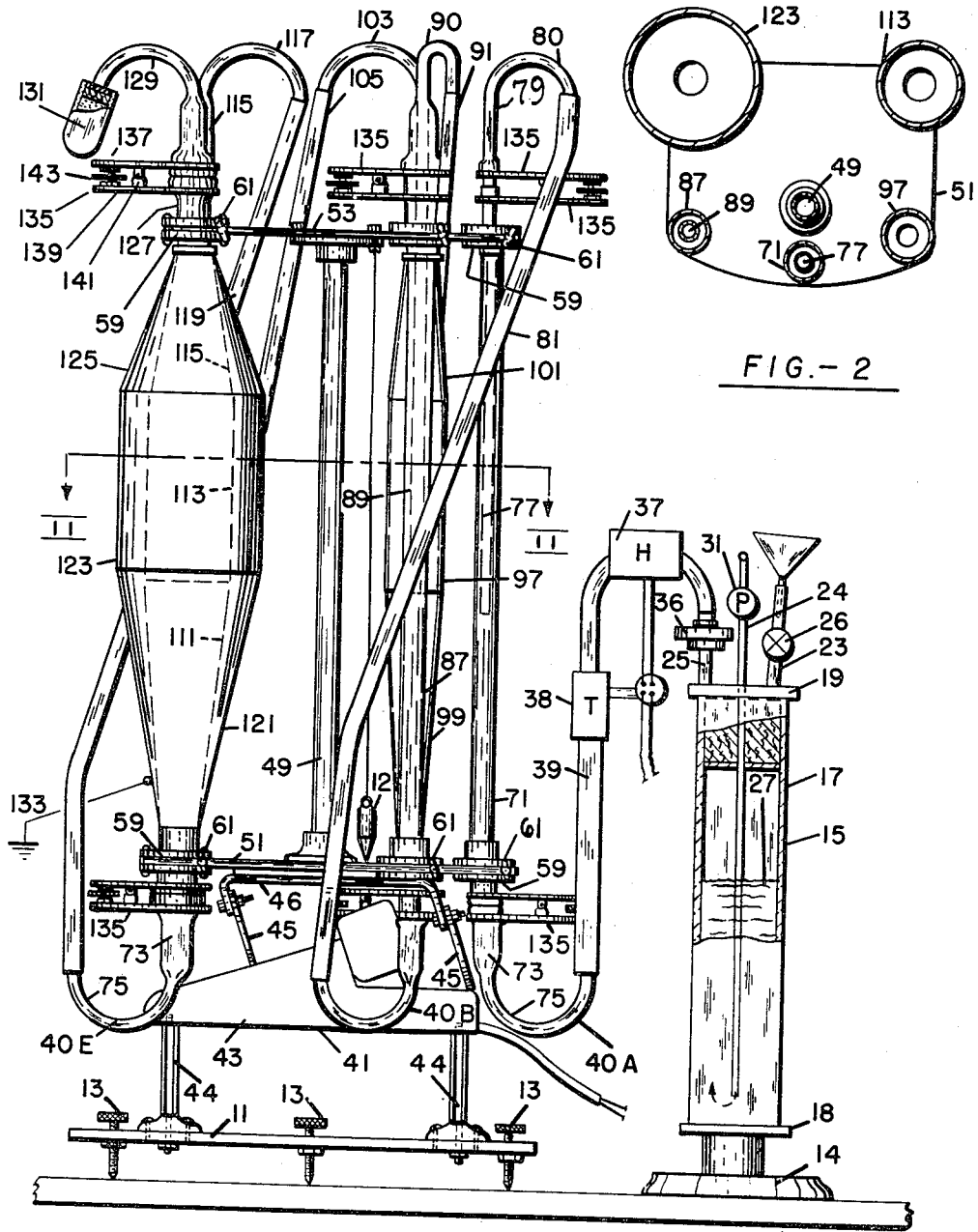

2,708,516

APPARATUS FOR SEPARATING AND CLASSIFYING FINELY DIVIDED SOLID MATERIALS

George L. Matheson, deceased, late of Summit, N. J., by The Summit Trust Company, executor, Summit, Walter G. May, Union, and Donald L. Baeder, Fanwood, N. J., assignors, by direct and mesne assignments, to Esso Research and Engineering Company, a corporation of Delaware Application March 24, 1953, Serial No. 344,422

3 Claims. (Cl. 209—139)

The present invention relates to an apparatus and process for separating and classifying finely divided solid particles. It relates more particularly to an apparatus and process for separating and classifying such particles according to their free fall characteristics. The invention further pertains to the accurate separation and classification of finely divided solids sequentially graded into a series of particle sizes depending upon their respective free fall velocities in gases and the like.

In the prior art various attempts have been made to fractionate finely divided solid materials into classes by particle size or by gravity characteristics in various ways. In United States Patent No. 2,019,507, for example, there is disclosed an apparatus which has been successful in some degree in separating a single cut or grade from a mass of finely divided materials according to free fall velocities in fluids, for example, in an air stream. In this patent there is disclosed the principle of vibrating a mass of finely divided particles and passing a jet of air or other suitable fluid against such a mass so as to entrain and carry out of the apparatus certain particles of a predetermined maximum size or free fall characteristic. According to this patent a single cut of the finely divided solids may be separated on the basis of free fall characteristics of the particles in such cut as determined by Stokes' law.

Apparatus such as that described in the patent mentioned above has the very severe practical limitation that only one size or classification of solid particle may be separated in one operation. If it is desired to separate two, three or more grades or classes of materials it is necessary to perform two or three or more separate fractionating operations. This limits the utility of prior art apparatus and processes. It is an object of the present invention to overcome these deficiencies by establishing a system whereby a series of particles of accurately graded or graduated size or other gravitational classification may be established in a single classifying operation.

It is a further object of the present invention to make possible the separation of finely divided solids into a plurality of sizes or grades at a much more rapid rate than has hitherto been possible.

It is a still further object to obtain precision particle classification over an extended range of particle sizes, etc. A further specific object is to increase accuracy of grading by reducing cohesion between discrete solid particles and also reducing their adhesion to the apparatus. The latter is accomplished by controlling electrostatic characteristics in the mass of solids being classified. Appropriate conditioning of the fluid stream which effects particle classification is utilized for this purpose in a preferred modification of the invention.

Further objects will appear more clearly as this description proceeds. Therefore, reference will next be made to the drawing forming a part of this specification wherein a preferred embodiment of apparatus capable of carrying out the process of this invention is illustrated.

In such drawing, Fig. 1 shows an elevational view of apparatus embodying the invention and Fig. 2 shows a transverse sectional view, with parts omitted, of the apparatus of Fig. 1, taken substantially along the line 2—2 of said figure.

Before proceeding to a detailed description of the device it may be noted that in essence the system of the present invention contemplates the use of a series of vertical elutriating zones in each of which particles of a certain size or grade of a given portion of material to be classified are collected and particles of a lower free fall rate are elutriated to a succeeding zone where the operations are repeated. The system comprises a series of zones in which the respective masses of classified solids are collected and a separating or classifying chamber of cylindrical cross-section and arranged in accurate vertical alignment above the outlet portion of each collecting zone. These successive zones and chambers are connected in series to form successive portions of a continuous conduit, so that the same gas current must pass through all of them in series. The gas current is accurately metered or controlled in initial pressure and velocity. Preferably it is also quite accurately pre-conditioned by regulating its relative humidity. The degree of humidity desired is preferably obtained and controlled by passing the carrier or elutriator gas through water at an accurately controlled elevated pressure to substantially saturate the compressed gas. It is thereafter expanded to the desired operating pressure which ordinarily is approximately or slightly above atmospheric pressure. Compensation for temperature drop is provided by heating.

As shown in the drawing a preferred apparatus is mounted upon an adjustable base member 11, which may be a metal plate or the like. This plate supports a superstructure to be described below, and a plumb bob 12 is provided on such superstructure to assist in obtaining a strictly vertical alignment. Base plate 11 is provided with a plurality of adjusting screws 13 so that it may be accurately leveled for the apparatus on the superstructure which will be described presently. Mounted on its own separate base 14 is a humidifying device 15 comprising a cylindrical container 17 of vertical axis mounted in end closure units 18 and 19. The lower end closure 18 is attached to or formed as a part of the base 14. The upper end closure 19 is provided with three threaded openings which receive respectively tubes 23, 24 and 25. Tube 23 is controlled by a valve or metering device 26 so that the water is maintained at or approximately at a predetermined level as indicated at 27.

Air or other suitable fluid, preferably a gas, is supplied to the humidifying unit through the tube 24 by a pump or metering device 31. This tube leads into the water and nearly to the bottom of vessel 17. Air is supplied to this humidifier under pressure. The pressure of the air is regulated so that when it is released to substantially atmospheric or outflowing pressure it will have the desired relative humidity, being substantially or almost saturated to 100% relative humidity in passing through the humidifier. In practice, saturation is not quite reached and it is found that air pressure of approximately 10 p. s. i. g. in the humidifier gives substantially 50% relative humidity when the air is released to substantially atmospheric pressure and is warmed back to room temperature (at or near sea level).

The humidified air or gas leaves the humidifier through conduit 25 and pressure reducing valve 36 from which it emerges at the desired low pressure. From the reducing valve 36 the air passes at a predetermined rate controlled by metering device 31 and valve 36 through a heating device 37 which warms the air up to room temperature. The necessary heat may be supplied by heat exchange or by electrical or other heating means, under control of a thermostat 38. The humidified air (or other gas which may be used) then passes on through a conduit 39 to the first of a series of U-tubes or collecting vessels 40 and then to and through the series of elutriating chambers which comprise the solid particle classifier.

The classifying unit which includes the collectors 40 and the elutriating chambers to be described is mounted on a vibrating system indicated generally at 41. This system comprises a body or base member 43, supported on the base plate 11 by suitable rubber- or spring-mounted posts 44, and movable or vibrating bars 45 which extend upwardly from body member 43. Vibration of bars 45 in a more or less vertical plane with respect to body member 43 is caused by suitable electromagnetic means, e. g. a solenoid. A preferred arrangement provides for vibration with ordinary alternating current of standard frequencies, e. g. 25 to 60 cycles and with small amplitude, e. g. of the order of 0.001 to 0.05 inch. Such vibration is found to be quite satisfactory. It is much less noisy and annoying to operators than the mechanical systems commonly used in the prior art.

The vibrator bars 45 are bolted to a plate 46 which therefore vibrates with a substantially vertical motion when the vibrator is in operation. Plate 46 supports a superstructure which will next be described.

The classifier per se comprises a series of vertical cylinders which are all firmly supported by suitable clamping means in a pair of spaced upper and lower horizontal plates 51 and 53. A vertical rod or tube 49 connects plates 51 and 53 to form a light but relatively rigid superstructure for holding and vibrating the classifying apparatus. While it is preferred that vibration have a substantial vertical component, vibration in a horizontal or other plane is satisfactory.

The plates 51 and 53 which carry the classifying apparatus are of light weight, consistent with requisite rigidity, so that vertical vibration of the lower plate 51 and rod 49 vibrates the upper plate and all the apparatus supported thereby.

A series of vertical chambers of graduated size in cross-section are mounted in the upper and lower plates 53 and 51 by suitable clamps 59. These clamps are securely fastened to their respective plates 51 or 53. An adjustable winged nut 61 is provided for each of the clamps.

In the apparatus shown in the drawing there are five successive vertical classifying tubes or chambers. These progressively increase in cross-section or diameter, going down stream from the humidifier. Thus the first vertical tube 71 is of relatively small cross-section and is preferably in the form of a circular cylinder. Because of its small diameter its effective height preferably does not extend to the full height of some of the larger tubes. The reason for this is that a very small misalignment from vertical for a tall slender tube causes erratic separation of solids. The cause for this sensitivity to vertical alignment is not entirely clear but it appears that falling particles of finely divided solids tend to slide down a slightly sloping wall, to a markedly different degree than they fall down a strictly vertical tube. This effect is greatly aggravated for very tall tubes and the length to diameter ratio of the classifier tube (cylindrical) section should not exceed about 15 to 1 and it is preferably not over 12 to 1. Hence the outlet connection 77 for tube or chamber 71, extends down inside tube 71 to a point such that the effective height of tube 71 does not exceed 12 to 15 times its diameter as shown in dotted lines, Fig. 1 and in cross-section, Fig. 2. At its lower end there is connected for ready detachment the first one of the U-tubes 40, previously mentioned. This is indicated as 40A. Each tube 40 has an enlarged upper outlet portion 73 corresponding quite closely in inside diameter to tube 71. The U-bend itself is of smaller cross-section than the outlet portion as indicated at 75. It connects with the inlet tube 39 which leads from the pressure reducing valve previously described.

As explained above the tube 71 is connected to an outlet of reduced cross-section as indicated at 77. This outlet tube 77 is connected through a U-bend member 80 and a conduit 81, which may be a flexible hose, if desired, to the next collector or U-tube 40B which has a reduced portion 78 and a larger portion 73 as explained above. The second U-tube 40, like the others, is readily detachable from both the inlet line 81 and the vertical cylindrical chamber 87 which rises above its enlarged outlet and is connected thereto. In a typical example, the first two tubes 71 and 87 are both less than one inch in diameter and the reduced outlet connections for both of them extend inside a considerable distance below their tops.

The outlet 89 for chamber or tube 87 is of smaller cross-section or diameter than tube 87 and is preferably of about the same cross-section as tube 77. As it emerges from the chamber 89 tube 87 connects to a U-section (inverted) or conduit 90 which bends over and connects through another line 91, preferably of flexible tubing to the third U-tube 40C which is not seen in Fig. 1. This U-tube, like the others, has a small inlet and U-bend portion 75 and its enlarged outlet end 73 is connected to a still larger tubular chamber 97, the third classifier or elutriator of the series.

In order to preserve or approximate streamlined flow as far as practicable, the connection between outlet end part 73 of the third U-tube 40C and the large cylindrical chamber 97 is widened gradually by the use of a frusto-conical connector 99. Likewise, at its upper portion the cylindrical chamber 97 connects to a reducer 101 which is of frusto-conical shape and which terminates in a further reduced outlet conduit not shown in the drawing but like conduits 77 and 89. The latter connects through inverted U-tube connector 103 to a line 105 leading down to a fourth collector, another U-tube 40D, not visible in the drawing, but having a reduced inlet and U-bend portion 75. This U-tube 40D connects to a frusto-conical section 111 which leads to a cylindrical chamber 113 which is larger in diameter than cylinder 97. It is shown in dotted lines in Fig. 1.

The upper portion of the cylindrical chamber 113 is connected to the reducer 115 which in turn connects to an outlet tube of inverted U-bend 117. The latter is connected to flexible tube 119 leading down to collector or U-tube 40E. The latter connects to the lower end of a frusto-conical conduit 121 which connects with a large cylindrical section 123 serving as the last elutriator of the series. At its upper end elutriator 123 connects to frusto-conical reducer 125 which connects in turn to a further reducer 127 and inverted U-tube 129. The latter connects to a filter 131 or collector for the very fine solids which pass all the separators.

It is important that the axes of all the vertical chambers 71, 87, 97, 113, and 123 be quite accurately vertical. As pointed out above, however, the degree of accuracy required increases very greatly if the length to diameter ratio of a given chamber or tube exceeds 12 or 15 to 1. Hence the exit tube should be extended down within the smaller tubes as indicated in the dotted line parts 77 and 89. As a matter of fact, it is preferable to extend the outlet line 103 down inside tube 101 or 97 in similar fashion. This effect, it should be emphasized, is much greater than might be expected. Otherwise free fall conditions for particles which are being carried by the gas stream are not accurately maintained and particles tend to cohere and fall down the side wall, if it slopes, in the form of streams and the like.

In operation a stream of air is supplied to the humidifier 15 by metering device 31 under controlled pressure such that a desired relative humidity will be obtained when pressure is reduced. The air is humidified and then its pressure is reduced through valve 36 to the desired level, usually only slightly above atmospheric. The air is warmed back up to room temperature to stabilize its relative humidity. It is desirable to keep the relative humidity constant and not too low. Excessive dryness causes solid particles to cohere and adhere because of static charges. A relative humidity of 50% has been found very satisfactory, but other degrees of humidity can be used, provided they are kept constant or substantially so.

In order to reduce cohesion of particles and adherence to the walls of the tubes and chambers the whole system is vibrated at a controlled rate and amplitude by the electrically operated vibrator 43, 45, etc. By adjusting the screws 13 in the base plate 11 the whole unit may be orientated so that the cylindrical chambers 71, 87, etc. are all perfectly vertical. Lower and upper plates 51 and 53 are keyed or otherwise secured to bar or post 49 to prevent relative rotation. The vertical cylinders may also be grounded as at 133 in the case of cylinder 123 so as to dissipate electrostatic charges and thereby reduce further the tendency of fine solid particles to adhere to each other or to the walls of the apparatus.

The solids which are to be classified or separated are placed in the first U-tube 40A. Since the relative cross-section of the cylindrical elutriating chamber 71 is restricted the gas stream rising therethrough has a relatively high velocity. Particles of solid matter which are entrained tend to fall against the rising gas stream but only those whose free fall velocity is greater than the upward stream velocity in tube 71 eventually returned to the U-tube 73 where they are collected. All other particles are elutriated and carried overhead through the reduced tube 79 and the connection 81 to the second U-tube 40B.

The gas stream carries the solid particles out of U-tube 40B up into the vertical chamber 87. Here the process described above is repeated, all of the solids except those whose free fall velocity exceeds the velocity of the gas stream being carried overhead. Since tube or chamber 87 is larger in cross-section than tube 71 the velocity of the gas stream is lower and solids which were carried over from chamber 71 will separate out and collect in U-tube 40B because the velocity in chamber 87 is not sufficient to carry them overhead. All the finer particles, however, are carried out through the reduced connection 89 and into the third U-tube 40C which is not visible in the drawings. From here the process is repeated and a further cut of still finer particles collects in U-tube 40D. Likewise a still finer cut is accumulated in U-tube 40E beneath the last and largest cylinder 123. Only those particles which are so fine that their free fall velocity is less than the low upward gas stream velocity through cylinder 123 are carried over into the final collecting filter 131.

It will be understood, of course, that the number of collecting and elutriating units and their sizes may be varied in the system to obtain the number of cuts and the size or free fall classifications desired. The system illustrated separates fine solid material into six grades, the exact particle size depending on the specific gravity of the material, the diameter of each of the elutriating chambers, and the velocities of the gas stream.

In actual tests the apparatus has been shown to be highly accurate in grading various kinds of solids and it is not subject to serious variations even if the original humidity of the solids to be classified is not particularly uniform. The humidifier has been found to be very effective for giving uniform classification results with solids that are very dry as well as those that are highly saturated with moisture. These come quite quickly to equilibrium with the gas stream.

With one type of solid material having a density of about 81 lbs. per cubic foot it was found that with a superficial gas velocity or free fall velocity of 0 to 0.052 feet per second particle sizes were 0 to 20 microns, calculated from Stokes' law. Particles of 20 to 40 microns were separated with a free fall velocity of .052 to 0.21 feet per second, those of 40 to 80 microns at velocity of 0.21 to 0.83 ft., those of 80 to 110 microns at 0.83 to 1.20 ft. and those of 111 to 150 microns at a velocity of 1.20 to 1.90 ft. With such material the gas supply was adjusted so that the air stream velocity in the first tube 71 was about 1.20 ft. The relative sizes of the successive elutriating chambers was adjusted to give appropriate air velocities.

The outlet end of each of the U-tubes is preferably of about the same size as the inlet end of the chamber above it and the abutting ends are clamped together, with suitable gasket material between them, to effect a smooth and leak proof joint, free from ledges or pockets where the finely divided solids can accumulate. The clamps, indicated generally at 135, each comprise an upper jaw member 137 and a lower member 139 hinged together at 141. An adjusting thumb screw 143 is tightened to spread the outer ends of jaw members 137, 139, thereby applying clamping pressure to the flanged tube ends, as will readily be understood.

The tubing connecting the successive units is preferably considerably smaller than the smallest of the vertical chambers 71, 87, etc. in order to prevent any hold-up in the non-classifying sections of the apparatus.

A test of the apparatus showed the following results. One type of solid material, widely used as a petroleum cracking catalyst, was tested both completely dry and saturated to 100% relative humidity. Upon being elutriated with air at 50% relative humidity, the two became so nearly uniform in free-fall characteristics that the two analyses checked each other, within the usual range of precision. This test establishes the fact that the solids come to equilibrium with the moisture content of the air very quickly; differences in solid density due to variations in their original moisture content are quickly evened out, and have no appreciable effect on the analysis. It is nevertheless desirable, for a high degree of accuracy, to have the solids at an original moisture content not far from equilibrium with air at relative humidity of 50%. It is, of course, essential to maintain the relative humidity of the air very nearly constant, preferably at 50%. This is necessary to maintain the solids being analyzed at a fixed moisture content, and consequently a fixed density. Under these conditions excellent results are consistently obtained.

For a high degree of accuracy in classifying test samples it is obviously desirable that the gas flow throughout be streamlined as much as possible to prevent accumulation of solids at connections. It is important to have all the connections as smooth and free from shoulders and pockets as possible, and especially the inlets to the elutriators.

The importance of (a) keeping the elutriating tubes or chambers truly or very nearly vertical and (b) limiting their effective length, can hardly be over emphasized when highly accurate results are desired in a minimum of time. This will be shown by the following data:

TABLE I

Effect of vertical alignment when employing elutriating tubes of various sizes

| | Sample Analysis, Wt. Percent | | | |
|---|---|---|---|---|
| Particle Size Microns | 26" Elutriating Tubes | | 3 Smallest Shortened to 12" | |
| | Algn. Out ⅛" in 26" | Alignment "Perfect" | Algn. Out[1] ⅛" in 26" | Alignment "Perfect" |
| 0–20 | 8.4 | 9.7 | 9.4 | 9.0 |
| 20–40 | 13.4 | 16.3 | 14.7 | 14.8 |
| 40–80 | 42.0 | 48.1 | 49.3 | 49.7 |
| 80–110 | 21.3 | 19.4 | 20.4 | 20.5 |
| 110–150 | 7.8 | 4.0 | 4.5 | 4.3 |
| 150+ | 7.1 | 2.5 | 1.7 | 1.6 |

[1] Purposely misaligned, showing that with the length of the 3 smallest tubes reduced to 12", alignment is not critical.

With this classifier or analyzer, results are closely reproducible as shown by the following data:

TABLE II

| Particle Size Microns | Sample Analysis, Wt. Percent | | | | | | |
|---|---|---|---|---|---|---|---|
| | 1 | 2 | 3 | 4 | 5 | 6 | 7 |
| 0-20 | 9.0 | 9.4 | 8.8 | 9.2 | 8.9 | 9.2 | 8.7 |
| 20-40 | 16.3 | 15.9 | 15.7 | 16.0 | 15.9 | 16.2 | 16.2 |
| 40-80 | 47.2 | 48.3 | 47.1 | 47.9 | 48.2 | 48.3 | 48.0 |
| 80-110 | 15.8 | 16.2 | 17.4 | 16.0 | 16.6 | 16.8 | 16.7 |
| 110-150 | 10.5 | 9.0 | 9.7 | 9.6 | 9.2 | 8.4 | 9.3 |
| 150+ | 1.2 | 1.2 | 1.3 | 1.3 | 1.2 | 1.1 | 1.1 |

By comparison, a prior art classifier, showed results varying from 1.27% up to 2.08% on a 0-10 micron cut, and from 23.30% down to 14.79% on a 40-60 micron cut. Other cuts showed similar though somewhat narrower fluctuations.

Running time was considerably reduced when the three smallest elutriator tubes (classifying chambers) were reduced in effective length to not exceed 15 times their diameter. Otherwise it was found that in some cases as much as 2 hours or more was required for a complete run. With the foreshortened tubes, obtained by simply extending the outlet tubes down into them to reduce their effective height, running time after 1 hour showed no appreciable effects (within limits of reproducibility). The data are summarized:

TABLE III

*Effect of running time*

| Particle Size Microns | Sample Analysis, Wt. Percent | |
|---|---|---|
| | 1 Hour | 2 Hours |
| 0-20 | 9.4 | 9.4 |
| 20-40 | 14.7 | 14.9 |
| 40-80 | 49.3 | 50.3 |
| 80-110 | 21.3 | 20.4 |
| 110-150 | 4.5 | 4.3 |
| 150+ | 1.7 | 1.6 |

It will be understood that numerous variations may be made in the apparatus without departing from the spirit of the invention. It will be obvious also that various forms of apparatus can be used to practice the method or process of this invention without departing from the spirit thereof. It is intended in the following claims to cover both apparatus and process as broadly as the state of the prior art will permit.

What is claimed is:

1. In combination, a plurality of U-bend tube elements in series each arranged to hold a mass of finely divided solids by gravity, a continuous gas conduit connecting said tubes in series and to a source of gas supply, said conduit including an upstanding vertical settler portion above the outlet leg of each of said tubes for elutriating and classifying said solids, said upstanding settler portions being respectively of larger and larger diameter down stream from said gas source, and wherein the settler portions which are of smallest diameter are shortened to an effective length not exceeding 15 times their diameter each by an outlet connection inserted downwardly into said settler portions through the upper ends thereof, and means for mechanically vibrating all said tubes to break up cohesion of particles and facilitate separation by gravity of successively smaller and smaller sized particles in successive tube and settler assemblies.

2. An apparatus of the character described, which comprises a base for said apparatus; adjustable means to dispose said base in a substantially level horizontal plane; vibrator means resiliently mounted on the upper surface of said base, including a horizontal, vibratable platform; a superstructure rigidly mounted on said platform, including a lower mounting plate disposed in parallel relation to said base; a vertical support rod secured at its lower end to said lower mounting plate; an upper mounting plate secured to the upper end of said support rod in parallel relation to said lower mounting plate; a series of vertical, elongated, substantially tubular conduit sections of substantially equal length, each conduit section secured to a mounting plate at each end and in substantially perpendicular relation to said mounting plates; an interior, cylindrical, elutriating chamber of substantially uniform diameter defined interiorly of each of said conduit sections, wherein said chambers are of increasing diameter from the first member of said series of conduit sections to the last member of said series, and wherein each of said chambers is limited to an effective length not exceeding fifteen times the diameter thereof; conduit means for passing a stream of a gasiform fluid through said series of chambers in sequence, including a U-bend conduit connection at the lower end of each conduit section in upward direct communication therewith; conduit means for introducing said stream of gasiform fluid into said first conduit section by way of the U-bend connection thereto, and means for discharging said gasiform fluid from the upper end of the last conduit section in said series.

3. An apparatus according to claim 2 wherein said U-bend conduit connections are of substantially equal inner diameter which diameter is less than the inner diameter of the first conduit section in said series of sections.

References Cited in the file of this patent

UNITED STATES PATENTS

| 1,894,623 | Lissman | Jan. 17, 1933 |
| 2,019,507 | Roller | Nov. 5, 1935 |
| 2,034,185 | Haultain | Mar. 17, 1936 |
| 2,579,228 | Erickson | Dec. 18, 1951 |

OTHER REFERENCES

Taggart, Handbook of Mineral Dressing, © 1945, section 19, pages 112–117 (Copy in Div. 55.)